Patented Jan. 12, 1932

1,840,395

UNITED STATES PATENT OFFICE

ALAN C. JOHNSTON, OF KENVIL, NEW JERSEY, ASSIGNOR TO HERCULES POWDER COMPANY, OF WILMINGTON, DELAWARE, A CORPORATION OF DELAWARE

METHOD FOR PRODUCING RESIN ACID ESTERS

No Drawing.   Application filed January 24, 1930.   Serial No. 423,265.

My invention relates to an improvement in method for producing resin acid esters, as of pimaric acid, abietic acid, etc., and more particularly for the production of rosin esters as of wood and gum rosin.

In accordance with my invention, I subject a resin acid, as such, or at present in a resin, to treatment with an alcohol, which will effect esterification of the resin acid, in the presence of an esterification catalyst comprising a sulfonic acid.

In the practical adaptation of my invention the resin acid which may, as has been indicated, be pimaric acid, abietic acid, etc., as such, or as found in resins, as, for example, wood rosin in the case of abietic acid, is subjected to treatment with an alcohol such, for example, as an aliphatic alcohol, which, for example, may be methyl ethyl, propyl, n-butyl, amyl, isopropyl, a glycol, glycerol, alcohols containing a ring, such as benzyl, cyclohexanol, or the like. The treatment is effected in the presence of heat and in the presence of a sulfonic acid, which will operate as an esterification catalyst, as for example, a sulfonic acid soluble in the alcohol used. The sulfonic acid may be, for example, para-toluene sulfonic acid, benzene sulfonic acid, naphthalene sulfonic acid, sulphosalicylic acid, napthol sulfonic acid, naphthionic acid, etc., etc. Desirably, the sulfonic acid will be used in amount of about 3% of the resin acid to be esterfied. The treatment may be desirably carried out under pressure.

As illustrative of the practical adaptation of my invention, for example, methyl abietate may be prepared by heating abietic acid, as such, or in the form of wood or gum rosin, say 480 g. of wood rosin, with say 480 g. of methanol (methyl alcohol) in the presence of, say, 15 g. of para-toluene sulfonic acid. The treatment may be at a temperature of 160° C., under a pressure of about 275 lbs. for a period of say four hours. When the treatment is completed, excess methanol is distilled off, under atmospheric pressure, and say 10 g. of soda ash added to neutralize the catalyst after which the ester (methyl abietate) may be distilled off, under reduced pressure. In the example given about 415 g. of methyl abietate, acid number 6, or a yield of about 87% will be obtained.

As further illustrative, for example, ethyl abietate may be produced by heating 320 g. of wood rosin and 500 g. ethyl alcohol in the presence of 10 g. sulfonic acid, as p-toluene sulfonic acid, for a period of four hours at a temperature of about 160° C. under a pressure of about 170 lbs., the ester, ethyl abietate, being distilled off, after removal of excess alcohol and neutralization of the catalyst with soda ash. In the example about 240 g. of ethyl abietate, or a yield of about 73%, will be obtained. If desired, the time required in the above example may be reduced, with some reduction in yield. Thus, for example, by heating to a temperature of about 235° C. under a pressure of about 650 lbs. for about one hour a yield of 200 g. of ethyl abietate will be obtained.

As further illustrative, for example, ethyl abietate may be produced by autoclaving 320 g. of rosin, 500 g. of 92% ethyl alcohol and 10 g. of beta naphthalene sulphonic acid, as a catalyst, at a temperature of 160° C. for about four hours. When the treatment is completed excess alcohol is distilled off under atmospheric pressure and soda ash added to neutralize the beta naphthalene sulphonic acid catalyst and the ethyl abietate distilled off under reduced pressure. The ethyl abietate produced amounts to about 245 g. acid number 15. In the example given beta naphthalene sulphonic acid may be replaced, for example, with sulfosalicylic acid as the catalyst and with such substitution there will be obtained about 210 g. of ethyl abietate, acid number 12. The ester may be redistilled over soda ash, if desired, with production of an ethyl abietate having an acid number of about 2.

As further illustrative, various esters as of n-butyl abietate and amyl abietate may be prepared by heating one mol rosin with ten mols n-butyl or amyl alcohol in the presence of a sulfonic acid, at, for example, a temperature of about 200° C., under a pressure of about 200 lbs., for four hours, for the production of n-butyl abietate and at a temperature of about 175° C., under a pressure of about 175 lbs., for four hours for the production of amyl abietate, a yield as high as 90% being obtainable.

As illustrative of the adaptation of my invention to the preparation of the ester with the use of glycol, for example, about 320 parts of wood rosin, grading 1 in color, and about 310 parts of ethylene glycol are heated to about 160° C. and about 10 parts of para-toluene sulfonic acid added. The temperature is then raised to and held at about 190° C. under atmospheric pressure, water and some glycol being permitted to distill off. On completion of the treatment the temperature is raised to about 300° C. under a pressure of about ½ inch of mercury to permit glycol, rosin, etc. to distill off. The product glycol diabietate will amount to about 285 parts, acid No. 1. If desired, glycerol may be substituted for glycol in the above example, the temperature being raised to about 250° C.

It will be noted in connection with the process embodying this invention that while theoretically, in the case of abietic acid, one mol of abietic acid will react with one mol of alcohol to form the ester, it is desirable to use a substantial excess of alcohol, say for example, five mols, and for higher yields say ten mols as indicated.

It will now be understood that the method according to my invention involves broadly the treatment of a resin acid with an aliphatic alcohol in the presence of a sulfonic acid for the production of a resin ester.

What I claim and desire to protect by Letters Patent is:

1. The method of preparing an ester of a natural resin acid which includes heating a resin acid with an aliphatic alcohol in the presence of a sulfonic acid.

2. The method of preparing an ester of a resin acid which includes heating abietic acid with an aliphatic alcohol in the presence of a sulfonic acid.

3. The method of preparing an ester of a resin acid which includes heating rosin with an aliphatic alcohol in the presence of a sulfonic acid.

4. The method of preparing an ester of a natural resin acid which includes heating under pressure a resin acid with an aliphatic alcohol in the presence of a sulfonic acid.

5. The method of preparing an ester of a resin acid which includes heating under pressure abietic acid with an aliphatic alcohol in the presence of a sulfonic acid.

6. The method of preparing an ester of a resin acid which includes heating under pressure rosin with an aliphatic alcohol in the presence of a sulfonic acid.

7. The method of preparing an ester of a natural resin acid which includes heating a resin acid with an aliphatic alcohol in the presence of about 3% of a sulphonic acid.

8. The method of preparing an ester of a resin acid which includes heating abietic acid with an aliphatic alcohol in the presence of about 3% of a sulfonic acid.

9. The method of preparing an ester of a resin acid which includes heating rosin with an aliphatic alcohol in the presence of about 3% of a sulfonic acid.

10. The method of preparing an ester of a natural resin acid which includes heating a resin acid with an aliphatic alcohol in the presence of para-toluene sulfonic acid.

11. The method of producing the butyl ester of a natural resin acid which includes heating a resin acid with butyl alcohol in the presence of a sulfonic acid.

12. The method of producing the butyl ester of a natural resin acid which includes heating a resin acid with butyl alcohol in the presence of para-toluene sulfonic acid.

13. The method of producing the butyl ester of a resin acid which includes heating rosin with butyl alcohol in the presence of a sulfonic acid.

14. The method of producing the butyl ester of a resin acid which includes heating under pressure rosin with butyl alcohol in the presence of para-toluene sulfonic acid.

15. The method of preparing an ester of a natural resin acid which includes heating a resin acid with an aliphatic alcohol in the presence of a sulfonic acid which is soluble in the alcohol.

16. The method of producing the butyl ester of a resin which includes heating at a temperature of about 200° C. under pressure rosin with butyl alcohol in the presence of para-toluene sulfonic acid.

17. The method of preparing an ester of a resin acid which includes heating rosin with an aliphatic alcohol in the presence of para-toluene sulfonic acid.

18. The method of preparing an ester of a resin acid which includes heating abietic acid with an aliphatic alcohol in the presence of para-toluene sulfonic acid.

19. The method of preparing an ester of a resin acid which includes heating one mole abietic acid with ten moles aliphatic alcohol in the presence of a sulfonic acid.

In testimony of which invention, I have hereunto set my hand at Kenvil, N. J., on this 22nd day of January, 1930.

ALAN C. JOHNSTON.